(12) United States Patent
Suzuki et al.

(10) Patent No.: US 8,227,112 B2
(45) Date of Patent: Jul. 24, 2012

(54) SEALED BATTERY AND MANUFACTURING METHOD THEREOF, VEHICLE MOUNTING THE SEALED BATTERY, AND BATTERY MOUNTING DEVICE MOUNTING THE SEALED BATTERY

(75) Inventors: Satoshi Suzuki, Toyota (JP); Hiroya Kondou, Toyohashi (JP); Masato Komatsuki, Gifu (JP); Youichi Naruse, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 237 days.

(21) Appl. No.: 12/670,700

(22) PCT Filed: Dec. 12, 2008

(86) PCT No.: PCT/JP2008/072602
§ 371 (c)(1),
(2), (4) Date: Jan. 26, 2010

(87) PCT Pub. No.: WO2010/067450
PCT Pub. Date: Jun. 17, 2010

(65) Prior Publication Data
US 2011/0183196 A1    Jul. 28, 2011

(51) Int. Cl.
H01M 2/02 (2006.01)
H01M 10/04 (2006.01)
(52) U.S. Cl. .................................. 429/185; 29/623.2
(58) Field of Classification Search .................. 429/185; 29/623.2
See application file for complete search history.

(56) References Cited

U.S. PATENT DOCUMENTS

| 6,455,193 B1 | 9/2002 | Miyazaki et al. |
| 2011/0183196 A1* | 7/2011 | Suzuki et al. ................. 429/185 |

FOREIGN PATENT DOCUMENTS

| EP | 1 037 292 A1 | 9/2000 |
| JP | 2000-106155 | 4/2000 |
| JP | 2000-268811 | 9/2000 |
| JP | 2004-119329 | 4/2004 |
| JP | 2005-149728 | 6/2005 |
| JP | 2005-190776 | 7/2005 |
| JP | 2007-18915 | 1/2007 |
| JP | 2008-41548 | 2/2008 |
| JP | 2008-137012 | 6/2008 |

* cited by examiner

Primary Examiner — Timothy Vanoy
(74) Attorney, Agent, or Firm — Finnegan, Henderson, Farabow, Garrett & Dunner, LLP (57) ABSTRACT

A sealed battery includes a battery case with a liquid inlet, a power generating element in the case, a lid member closing the liquid inlet and having a peripheral edge welded to the case over the entire circumference, a circular groove in the outer surface of the case and around the entire periphery of the liquid inlet, a peripheral portion provided over the entire periphery of a portion in the back surface of the lid member facing the liquid inlet, and a protrusion partially placed around the liquid inlet between the circular groove and the peripheral portion to form a clearance between the circular groove and the peripheral portion. The space facing the inner surface in a portion melted during welding between the peripheral edge and the case is continuous to the liquid inlet through a clearance formed by the protrusion between the circular groove and the peripheral portion.

19 Claims, 10 Drawing Sheets

PRIOR ART

SEALED BATTERY AND MANUFACTURING METHOD THEREOF, VEHICLE MOUNTING THE SEALED BATTERY, AND BATTERY MOUNTING DEVICE MOUNTING THE SEALED BATTERY

CROSS-REFERENCE TO RELATED APPLICATIONS

This application is a national phase application of International Application No. PCT/JP2008/072602, filed Dec. 12, 2008, the contents of which are incorporated herein by reference.

TECHNICAL FIELD

The present invention relates to a sealed battery such as a lithium ion secondary battery and more particularly to a sealed battery in which the periphery of a lid member covering a liquid inlet is sealed by laser welding. Furthermore, the present invention also relates to a manufacturing method of the sealed battery, a vehicle that mounts the sealed battery, and a battery mounting device that mounts the sealed battery.

BACKGROUND ART

A sealed secondary battery in which a power generating element is hermetically sealed in a case is heretofore used in a vehicle, an electric device, and others. For instance, there is a lithium ion secondary battery in which a power generating element including positive and negative electrode plates and electrolyte is contained in a flat rectangular case. A method of producing such battery may be achieved by inserting the electrode plates in the case and then sealing an opening of the case by a closing plate. After that, the electrolyte is poured through a liquid inlet provided in the closing plate. In this case, the liquid inlet has to be hermetically closed after pouring of the electrolyte.

Figure 13:
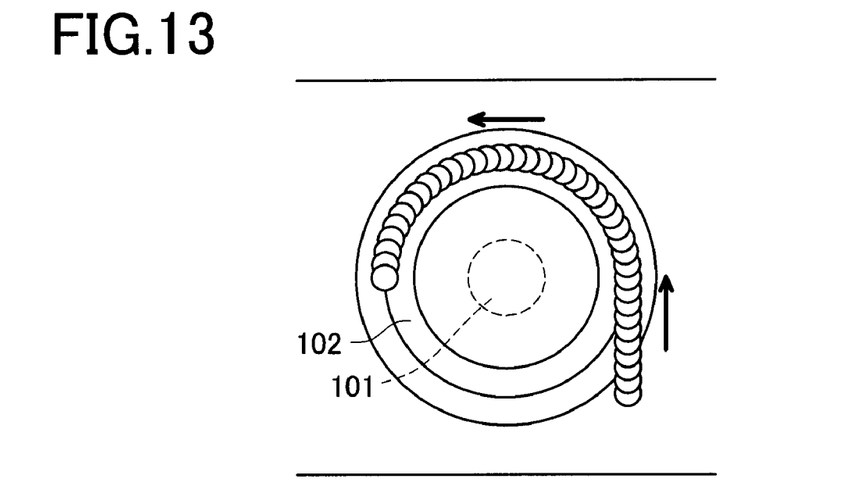
FIG. 13 is a plan view showing a welding process.

For hermetically closing the liquid inlet, one conventional method is achieved by placing a closing member on a liquid inlet and then welding the closing member to the liquid inlet by laser. For instance, as shown in FIG. 13, the peripheral edge of a closing member 102 covering a liquid inlet 101 is welded thereto sequentially by laser, thereby hermetically closing the liquid inlet 101. However, as disclosed in Patent Literature 1 for example, blowholes might be generated in a welded portion. The blowholes are caused by gas generated during laser welding. In this Patent Literature 1, a main cause of the gas generation is considered as climbing or creeping up of electrolyte. Therefore, a water repellent agent or an oil repellent agent is coated on the vicinity of a laser welded portion. This is assumed to prevent generation of blowholes.
[Patent Literature 1] JP2000-106155A

SUMMARY OF INVENTION

Technical Problem

However, the technique of the above Patent Literature has the following problems. Even when the coating of the water repellent agent or the oil repellent agent can prevent the climbing or creeping up of electrolyte, it is impossible to completely prevent the generation of welding gas during welding. The welding gas results not only from vaporization of electrolyte. But for instance, the welding gas may be generated also by vaporization of melted metal itself. This would cause the following problems.

Figure 14:
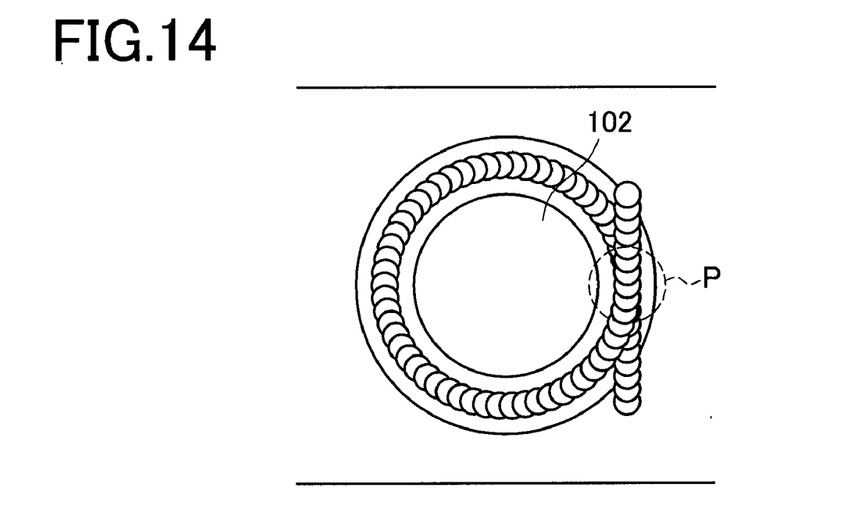
FIG. 14 is a plan view showing the welding process.

At a final stage of the welding process shown in FIG. 13, a portion having been already welded is repeatedly subjected to welding as shown by a broken line P in FIG. 14. Before overlapping of welded portion, an unwelded portion exists ahead in a traveling direction and near the currently welded portion and a certain amount of clearance is left therein. Accordingly, the generated welding gas is allowed to easily leak out through the clearance. In the overlapping zone, however, the welding gas could not leak out.

Figure 15:
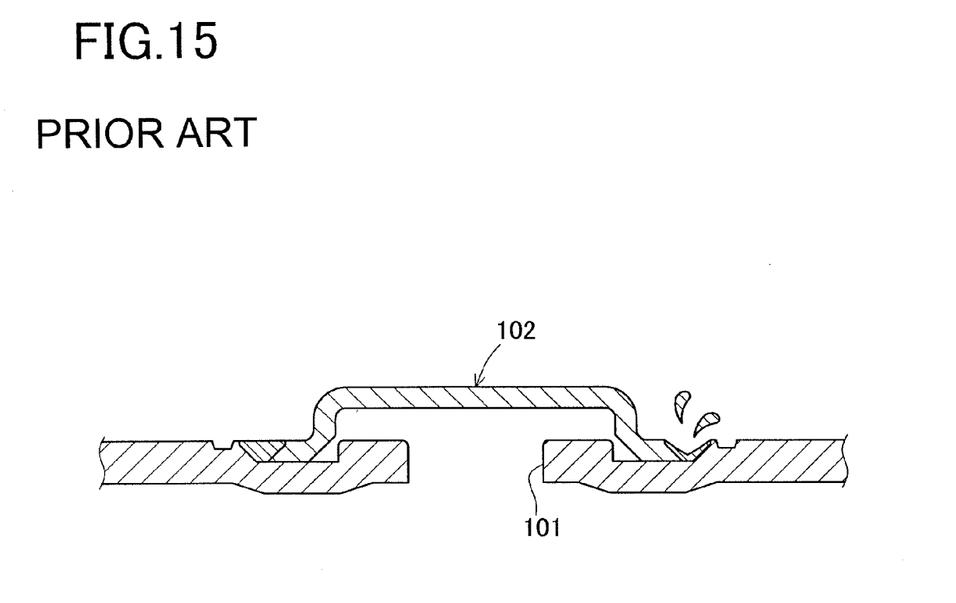
FIG. 15 is a sectional view of a conventional liquid inlet.

Thus, as schematically shown in FIG. 15, the metal melted would be blown off by the welding gas. This is referred to as welding spatter. In case the welding spatter occurs, the welding strength in that portion is apt to be insufficient.

The present invention has been made in view of the circumstances to solve the problems of the above conventional technique. Specifically, a purpose of the invention is to provide a sealed battery and a manufacturing method thereof, capable of preventing generation of welding spatter and providing sufficient welding strength even in a configuration that the periphery of a liquid inlet is hermetically closed by laser welding, and a vehicle and a battery mounting device, each of which mounts the sealed battery.

Solution to Problem

To achieve the above purpose, the invention provides a sealed battery comprising a battery case formed with a liquid inlet, a power generating element contained in the battery case, and a lid member closing the liquid inlet, a peripheral edge of the lid member being welded to the battery case over the entire circumference, the sealed battery comprising: a first facing portion provided in an outer surface of the battery case on an inner circumferential side than a welded portion and around the entire periphery of the liquid inlet, the first facing portion facing a back surface of the lid member; a second facing portion provided around the entire periphery of a portion in the back surface of the lid member facing the liquid inlet, the second facing portion facing the first facing portion; and a clearance forming member partially placed around the liquid inlet between the first and second facing portions to form a clearance between the first and second facing portions, the inside face of the portion melted during welding between the peripheral edge of the lid member and the battery case is linked to the liquid inlet by continuous space through the clearance formed between the first facing portion and the second facing portion by the clearance forming member.

According to the sealed battery of the invention, around the entire periphery of the liquid inlet, the first facing portion of the battery case and the second facing portion of the lid member are provided to face each other. The clearance forming member is further provided between the first and second facing portions. Accordingly, a clearance is formed between the battery case and the lid member around the entire periphery of the liquid inlet. The inside face of the portions melted during welding is linked to the liquid inlet by space through the clearance. The gas generated during welding is therefore allowed to escape into the battery through the liquid inlet. Thus, even in the configuration that the periphery of the liquid inlet is hermetically closed by laser welding, it is possible to prevent the generation of welding spatter, thereby achieving a battery having sufficient welding strength.

In the present invention, preferably, the clearance forming member is a protrusion formed in the first facing portion. With this configuration, the clearance is formed between the first and second facing portions simply by placing the lid member to cover the liquid inlet. Accordingly, the clearance can be easily provided.

Alternatively, the clearance forming member may be a protrusion formed in the second facing portion. Alternatively, the clearance forming member may be a protrusion formed on both the first and second facing portions in places that do not interfere with each other. Those configurations can also provide the same advantages as above.

In the present invention, furthermore, it is preferable that overlapping zone where the peripheral edge of the lid member was welded both at an initial welding stage and at a final welding stage is a portion corresponding to the clearance formed by the clearance forming member. This configuration can reliably escape the welding gas generated at an overlapping zone.

In the present invention, furthermore, it is preferable that the clearance forming member is in non-contact with the portions melted in welding the peripheral edge of the lid member in at least overlapping zone where the peripheral edge was welded both at an initial welding stage and at a final welding stage. This configuration can also reliably escape the welding gas generated in the overlapping zone.

Another aspect of the invention provides a method of manufacturing a sealed battery comprising a battery case formed with a liquid inlet, a power generating element contained in the battery case, and a lid member closing the liquid inlet, a peripheral edge of the lid member being welded to the battery case over the entire circumference, the method comprising the steps of: preparing the battery case in which a first facing portion is provided in an outer surface of the battery case on the inner circumferential side than a welding portion and around the entire periphery of the liquid inlet, the first facing portion being to face a back surface of the lid member; preparing the lid member in which a second facing portion is formed in the back surface of the lid member around the entire periphery of a portion facing the liquid inlet, the second facing portion being to face the first facing portion; placing the lid member to cover the liquid inlet of the battery case by partially placing a clearance forming member between the first and second facing portions around the liquid inlet so that a clearance is formed between the first and second facing portions in places where the clearance forming member is absent and a clearance between the peripheral edge of the lid member and the battery case is linked to the liquid inlet through the clearance formed between the first and second facing portions by the clearance forming member; and welding the peripheral edge of the lid member to the battery case.

The preparing step may be achieved by manufacturing the relevant members in-house or obtaining subcontracted members or buying commercially available members if having appropriate shapes.

In the present invention, furthermore, preferably, the battery case which is formed with a protrusion serving as the clearance forming member in the first facing portion is prepared in the step of preparing the battery case. Alternatively, the lid member which is formed with a protrusion serving as the clearance forming member in the second facing portion is prepared in the step of preparing the lid member.

Furthermore, another aspect of the present invention provides a vehicle that mounts the sealed battery having the above features. Moreover, another aspect of the invention provides a battery mounting device that mounts the sealed battery having the above features.

Advantageous Effects of Invention

According to the sealed battery and the manufacturing method thereof, the vehicle and the battery mounting device, each mounting the sealed battery, even the configuration that hermetically closes the periphery of the liquid inlet by laser welding can prevent the generation of welding spatter and provide sufficient welding strength.

REFERENCE SIGNS LIST

10 Secondary battery
11 Battery case
16 Power generating element
21 Liquid inlet
22 Circular groove
23, 45 Protrusion
42 Peripheral part
31 Lid member

DESCRIPTION OF EMBODIMENTS

A detailed description of a preferred embodiment of the present invention will now be given referring to the accompanying drawings. In this embodiment, the invention is applied to a lithium ion secondary battery having a flat rectangular shape and a battery case thereof.

Figure 1:
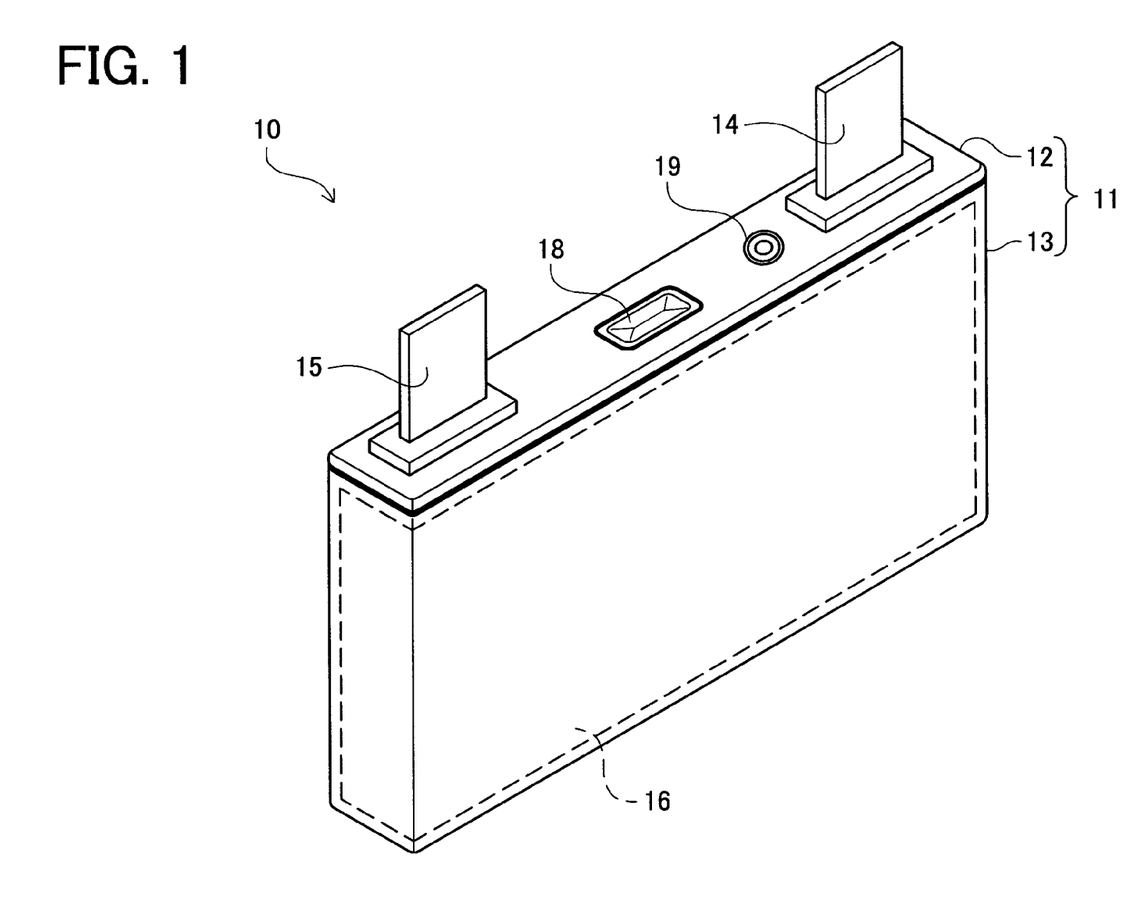
FIG. 1 is a perspective view of a secondary battery in an embodiment.

A secondary battery 10 in this embodiment is configured such that a power generating element 16 is contained in a battery case 11 as shown in FIG. 1. The battery case 11 has a box-shaped case body 13 having an open face and a closing plate 12 that closes the open face. On the upper side of the closing plate 12 in the figure, a positive terminal 14 and a negative terminal 15 each serving as an external electrode terminal are attached to protrude. Those positive terminal 14 and negative terminal 15 are respectively connected to positive and negative electrode plates and others included in the power generating element 16. A safety valve 18 and a liquid pouring part 19 are formed in the closing plate 12 of the battery case 11 between the terminals 14 and 15.

Figure 2:
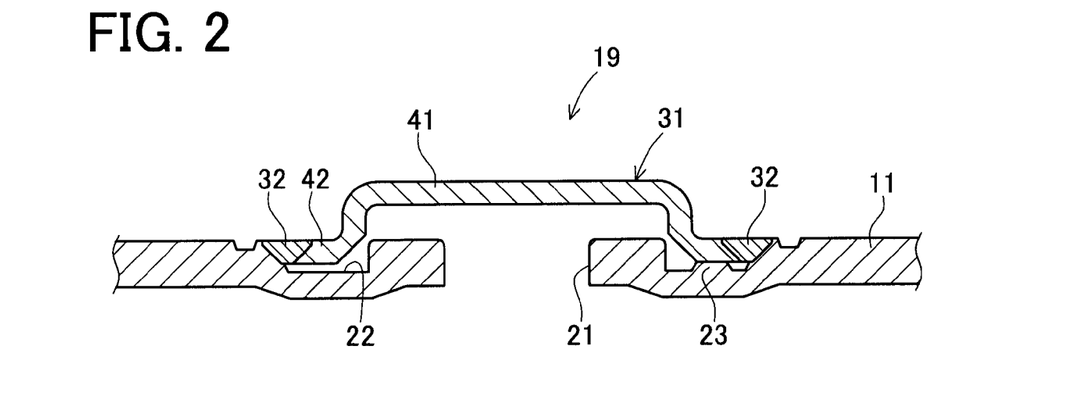
FIG. 2 is a sectional view of a liquid pouring part in the embodiment.
Figure 3:
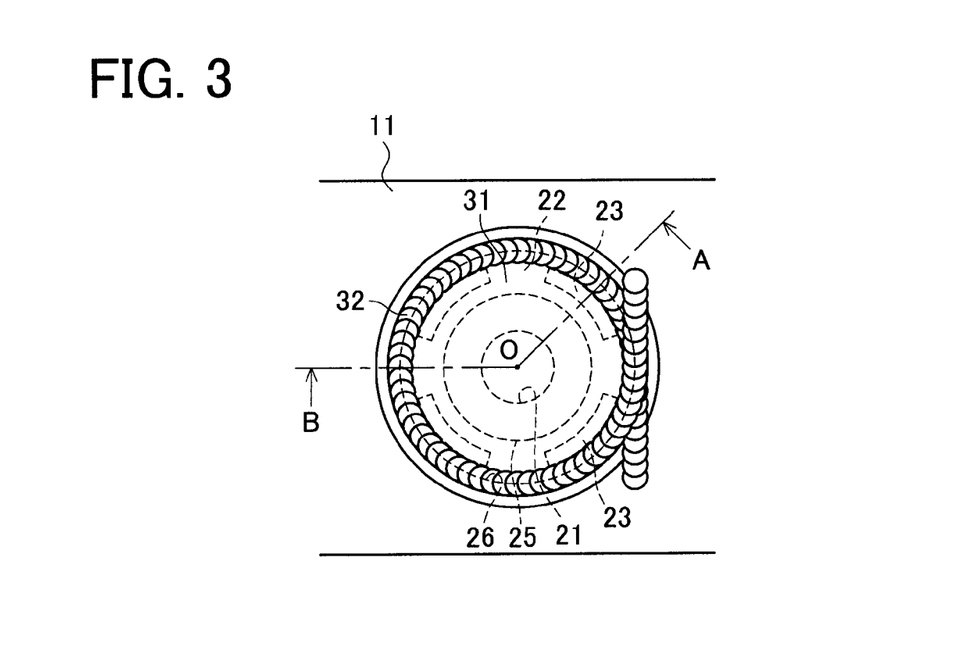
FIG. 3 is a plan view of the liquid pouring part in the embodiment.

The liquid pouring part 19 in this embodiment has a liquid inlet 21 formed through the battery case 11 and a lid member 31 that closes the liquid inlet 21 as shown in a sectional view of FIG. 2. The battery case 11 and the lid member 31 are fixed in a manner that the peripheral edge of the lid member 31 is welded in the entire circumference so as to surround the liquid inlet 21 as shown in FIG. 3. The once melted portion in this welding process is a welded portion 32.

In this embodiment, the space facing the lower surface of the welded portion 32 is continued to the liquid inlet 21 through a clearance between the lid member 31 and the battery case 11. The same also applies to a right part in FIG. 2. In this figure, the space appears to be blocked by a protrusion 23. However, the protrusion 23 is discontinuous as shown in FIG. 3. The protrusion 23 is not in contact with the welded portion 32. The protrusion 23 is formed on the inner circumferential side than the welded portion 32. The details of the protrusion 23 will be explained later.

In the secondary battery 10 in this embodiment, the welding process of the battery case 11 and the lid member 31 is performed in the same manner as a conventional one. To be more specific, a laser is irradiated continuously along a welding portion while sequentially shifting the laser so as that irradiation spots are superimposed partially as shown in FIG. 13. The laser is preferably a pulse laser such as a YAG laser. In this embodiment, the battery case 11 and the lid member 31 are made of the same metal. For example, aluminum, iron, or others is appropriate.

Figure 4:
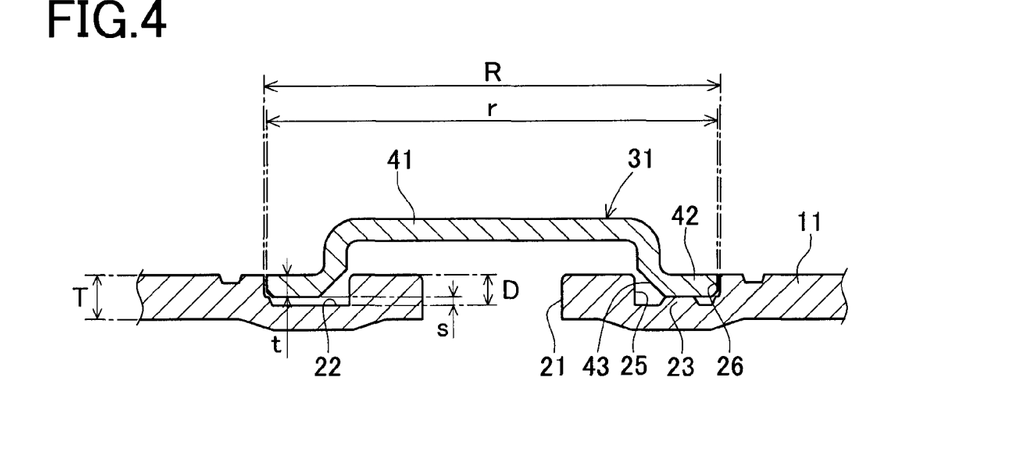
FIG. 4 is a sectional view of the liquid pouring part before welding.
Figure 5:
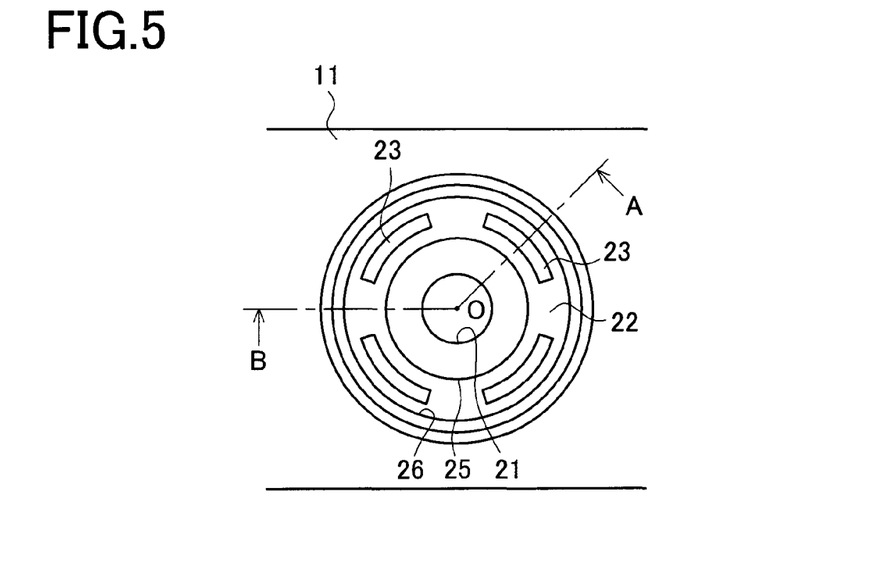
FIG. 5 is a plan view of the liquid pouring part before welding.

A state before welding is shown in FIGS. 4 and 5. FIG. 4 is a sectional view of a state before welding in which the lid member 31 is merely placed on the battery case 11. FIG. 5 is a plan view of the battery case 11 before the lid member 31 is attached. This figure shows only the liquid inlet 21 and its surrounding. FIGS. 2 and 4 each show a sectional view taken along a line A-O-B in FIG. 3 or 5.

The battery case 11 before welding has the liquid inlet 21 and a circular groove 22 provided around the liquid inlet 21 as shown in FIGS. 4 and 5. The liquid inlet 21 is a through hole. The circular groove 22 is an annular groove formed on the slightly outer side than the circumference of the liquid inlet 21 and to surround all around the liquid inlet 21. The circular groove 22 has a bottom formed with protrusions 23 circumferentially spaced apart as shown in FIG. 5. Herein, as the protrusions 23, four arcuate protrusions are separately arranged. Accordingly, the protrusions 23 do not fully surround the liquid inlet 21. That is, when seen from the side of the liquid inlet 21, the protrusions 23 are absent in certain directions. The protrusions 23 are not in contact with an inner circumferential wall 25 and an outer circumferential wall 26 of the circular groove 22. This circular groove 22 corresponds to the first facing portion and the protrusions 23 correspond to the clearance forming member respectively.

The lid member 31 before welding is made of a plate material formed in a hat-like shape. Specifically, as shown in FIG. 4, it includes a central portion 41 protruding upward in the figure and a peripheral portion 42 having a flange shape surrounding the entire periphery of the central part 41. This peripheral portion 42 is to be inserted in the circular groove 22 of the battery case 11. Furthermore, at a boundary between the central portion 41 and the peripheral portion 42, a portion on a lower side in the figure (a side facing the battery case 11) is entirely circumferentially chamfered into a slant surface 43. This peripheral portion 42 corresponds to a second facing portion.

When the lid member 31 in this embodiment is engaged in the circular groove 22 of the battery case 11, the circular groove 22 faces the lower surface of the peripheral portion 42 as shown in FIG. 4. However, the lower surface of the peripheral portion 42 does not contact with the bottom of the circular groove 22 and is placed on the protrusions 23. Furthermore, the outer diameter "r" of the lid member 31 is designed to be slightly smaller than the outer diameter "R" of the circular groove 22 of the battery case 11. Accordingly, the peripheral portion 42 of the lid member 31 enters in the circular groove 22 without any stress. Thus, a clearance of about 0.1 mm or less is left between the outer periphery of the lid member 31 and the outer circumferential wall 26 of the circular groove 22.

At each place where no protrusion 23 exists, a clearance is left between the peripheral portion 42 and the circular groove 22 as shown on the left side in FIG. 4. This clearance allows communication between the space on the inner side and the space on the outer side of the protrusions 23. The inner circumferential wall 25 of the circular groove 22 and the slant surface 43 of the lid member 31 are not in contact with each other. Accordingly, in a state before welding, the clearance between the outer periphery of the lid member 31 and the outer circumferential wall 26 of the circular groove 22 is communicated with the inside of the battery case 11 through the circular groove 22 and the liquid inlet 21. Furthermore, since the protrusions 23 are spaced apart, the clearance in each place where the protrusion 23 exists as shown on the right side in FIG. 4 is also communicated with the inside of the battery case 11.

In this embodiment, as shown in FIG. 4, the battery case 11 has an almost uniform thickness T on the outer side than the circular groove 22. The peripheral portion 42 of the lid member 31 has a thickness "t" which is about half of the thickness T of the battery case 11. The circular groove 22 has a depth "D" almost equal to the sum of the thickness "t" of the peripheral portion 42 and the height "s" of the protrusion 23. When the lid member 31 is inserted in the circular groove 22 of the battery case 11, the upper surface of the battery case 11 located on the outer side than the circular groove 22 is almost flush with the upper surface of the peripheral portion 42.

A method of manufacturing the secondary battery 10 in this embodiment will be explained below. Firstly, the closing plate 12, the case body 13, the power generating element 16, and the lid member 31 are separately produced. A wound electrode body serving as the power generating element 16 is inserted in the case body 31. The case body 31 is closed by the closing plate 12. In this way, the battery case 11 is composed of the closing plate 12 and the case body 13. At this stage, the liquid inlet 21 remains exposed. Through this liquid inlet 21, an appropriate amount of electrolyte is poured into the battery case 11. This liquid pouring method has been publicly known. Then the lid member 31 is put on the liquid inlet 21, so that the central portion 41 of the lid member 31 covers the liquid inlet 21, resulting in the arrangement shown in FIG. 4.

The boundary between the peripheral portion 42 of the lid member 31 and the circular groove 22 of the battery case 11 is sealed from outside by laser welding. In other words, the laser is irradiated along the outer circumference of the peripheral portion 42 from above downward in FIG. 4. The laser used is a pulse laser such as a YAG laser. The welding process is the same as a conventional one.

Specifically, as shown in FIG. 13, the laser starts to irradiate a portion slightly apart from the outer circumference of the peripheral portion 42. After the laser pulse becomes stable, the laser is caused to reach a welding site of the peripheral portion 42. The laser goes round along the outer circumference of the peripheral portion 42 to sequentially weld it by superimposing the irradiation spots partially one on another. Finally, as shown in FIG. 14, after the laser spot goes beyond the overlapping zone surrounded by the broken line P, the laser is stopped at a slightly overrun point. When the entire circumference is completely welded as above, the secondary battery 10 is completed.

In this embodiment, as described above, the welding portion between the lid member 31 and the battery case 11 is linked to the inside of the battery case 11 by space through the liquid inlet 21. Accordingly, the gas generated from the metal melted by welding is allowed to escape into the battery case 11 through the liquid inlet 21. In other words, even at the overlapping zone where welding is performed at initial and final stages of welding process, an escape path for the generated welding gas is ensured. In particular, the overlapping zone is brought to coincide with a place where no protrusion 23 is provided and thus the escape path for the welding gas is more reliably ensured. This prevents the generation of welding spatter. It is to be noted that entrance of the welding gas into the battery will not cause any problem in battery performance.

Figure 6:
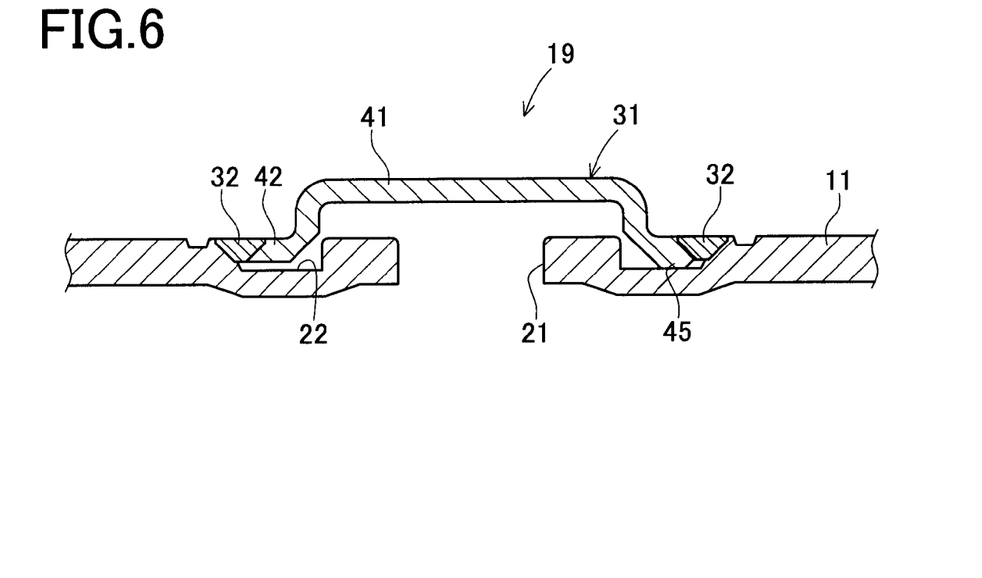
FIG. 6 is a sectional view of a protrusion in another example.

In the above explanation, the protrusions 23 are provided at four place in the circular groove 22. Instead of providing the protrusions 23 in the circular groove 22, protrusions 45 may be provided on the lower surface of the peripheral portion 42 of the lid member 31 as shown in FIG. 6. In either case, the protrusions are not independent components and hence the number of components does not increase. A clearance forming member may be provided as an independent component. In this case, however, the number of components and workability are somewhat unfavorable.

Figure 7:
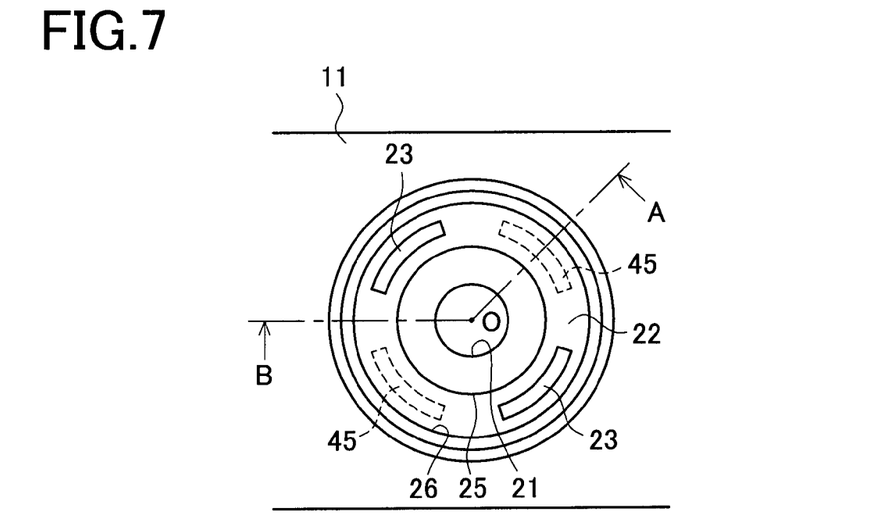
FIG. 7 is a plan view of a protrusion in another example.
Figure 8:
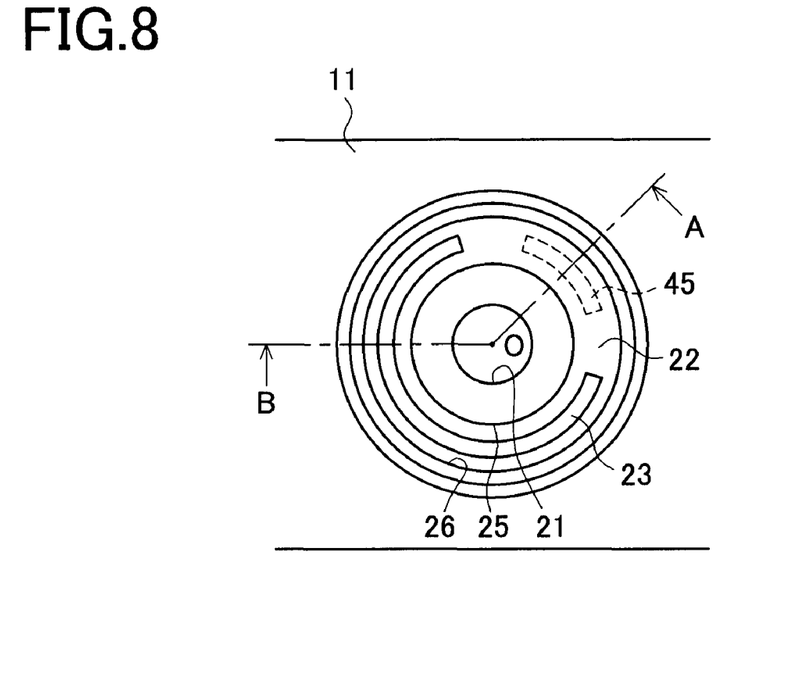
FIG. 8 is a plan view of a protrusion in another example.
Figure 9:
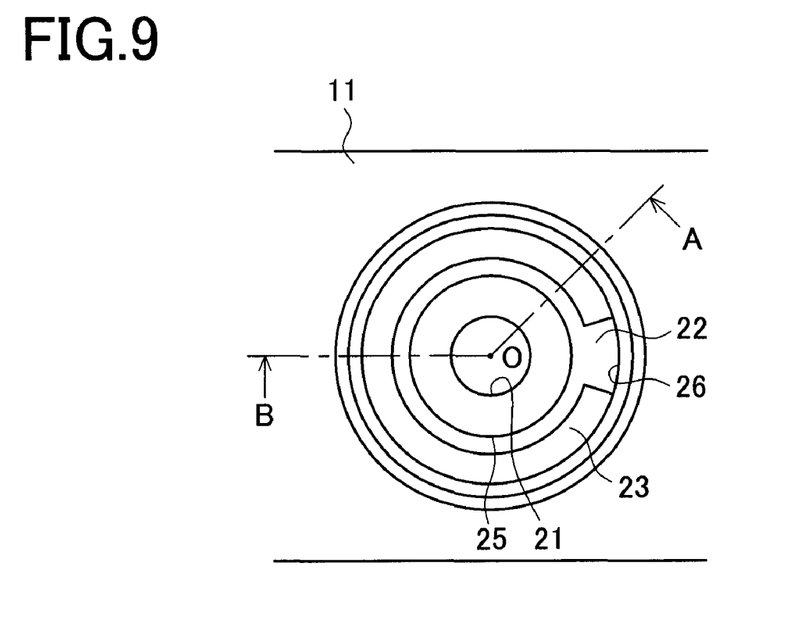
FIG. 9 is a plan view of a protrusion in another example.

As shown in FIG. 7, it may be arranged such that a protrusion 23 is provided in the circular groove 22 and a protrusion 45 is provided in the lid member 31 respectively in positions that they do not interfere with each other. Furthermore, as shown in FIG. 8, the protrusions 23 and 45 may be arranged in asymmetrical relation to serve as a guide for adjusting the orientation of the lid member 31 within a level plane. As shown in FIG. 9, the protrusion 23 may be provided in the entire circumference excepting the overlapping zone. The protrusion 23 may be continuous with the inner circumferential wall 25. Alternatively, the protrusion 23 may be continuous with the outer circumferential wall 26 excepting in the overlapping zone as shown in FIG. 9.

The present inventors made experiments to test the effects of the invention. As Examples 1 and 2, two types of battery cases 11 provided with protrusions 23 having heights of 0.05 mm and 0.10 mm respectively were made by trial. Herein, as shown in FIG. 5, the protrusions 23 were provided at four places in the circular groove 22. Three types including a comparative example having no protrusion in addition to the above two types were subjected to a sealing process using laser welding. A rate of occurrence of welding spatter was checked over. The lid member 31 used herein has a thickness of 0.4 mm. In Comparative example, no protrusion 23 was formed and the depth of the circular groove was made almost equal to the thickness of the lid member 31.

TABLE 1

| | Clearance from Groove (mm) | Thickness of Lid member (mm) | Rate of Occurrence of Welding spatter (%) |
| --- | --- | --- | --- |
| Example 1 | 0.05 | 0.4 | 0.00 |
| Example 2 | 0.10 | 0.4 | 0.00 |
| Comparative Example | 0.00 | 0.4 | 0.5-0.8 |

The results of the experiments are as shown in Table 1. Specifically, in both Example 1 in which the clearance size was 0.05 mm and Example 2 in which the clearance size was 0.10 mm, welding spatter did not occur. In Comparative example, welding spatter occurred in 0.5% to 0.8% of the battery cases 11. Thus, the results reveal that it is sufficient to provide the clearance having a size of about 10% or more of the thickness of the lid member 31.

According to the secondary battery 10 in the present embodiment explained above in detail, since the protrusions 23 are formed in the circular groove 22 surrounding the liquid inlet 21, the welded portions are linked to the inside of the battery case 11 by space. Accordingly, the welding gas generated in a welding work is allowed to escape into the battery case 11. This prevents the occurrence of welding spatter which could be caused by the welding gas blowing outside. Consequently even the configuration that hermetically closes the liquid inlet by laser welding can prevent the occurrence of welding spatter and provide sufficient welding strength.

Figure 10:
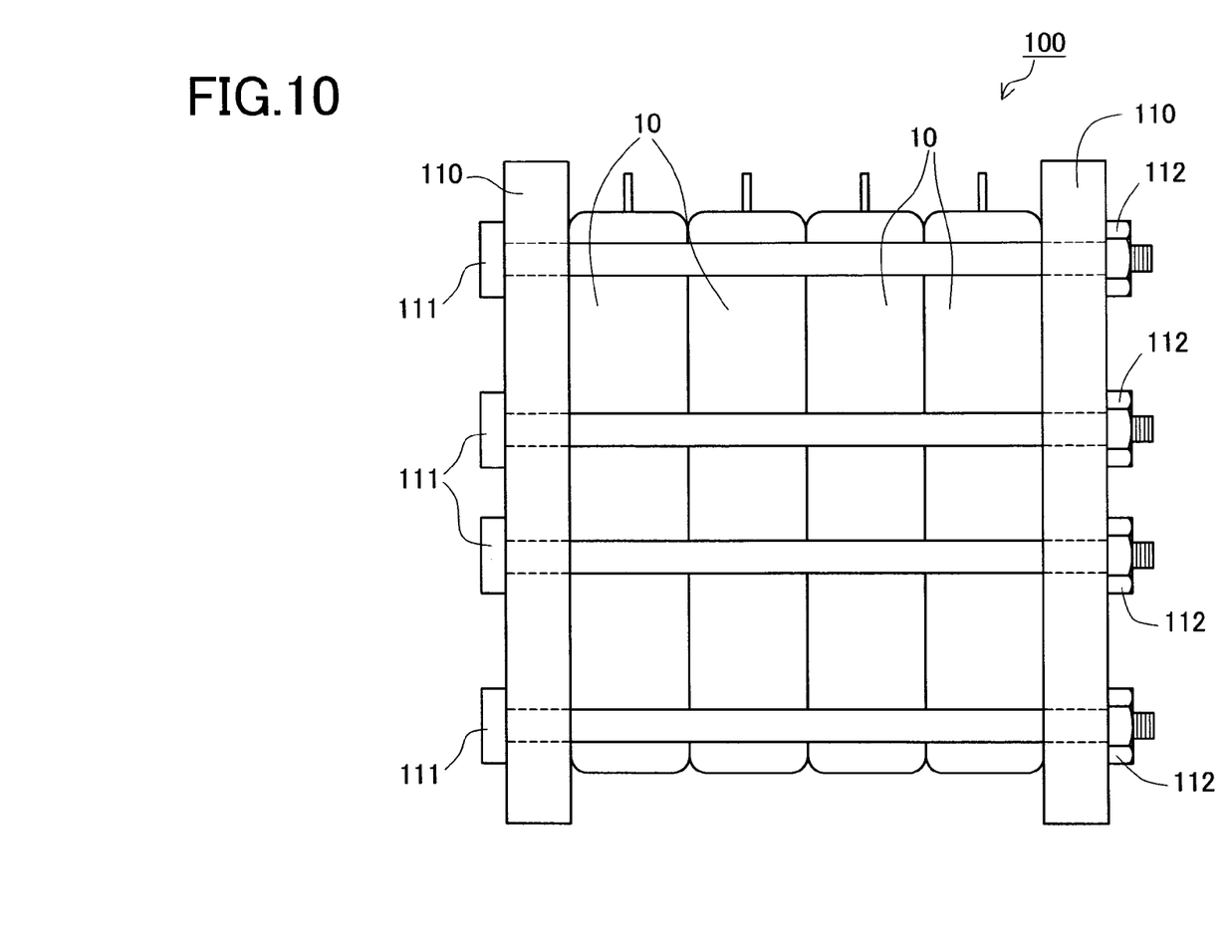
FIG. 10 is a side view of a battery pack containing secondary batteries in the embodiment.

The following explanation is given to a usage example in which the secondary battery 10 in the present embodiment is mounted in various devices. For example, as shown in FIG. 10, a plurality of secondary batteries 10 is used to produce a battery pack 100. The secondary batteries 10 are arranged so that their external electrode terminals are disposed on the same side and the side surfaces (having a large surface area) of the adjacent secondary batteries 10 are placed in contact with each other. Binding plates 110 are placed on both sides and tightened with binding screws 111 and nuts 112. Thus, the secondary batteries 10 bound under a binding pressure appropriate for use can be used. Furthermore, the positive terminal 14 and the negative terminal 15 of each secondary battery 10 are sequentially connected in series to form the battery pack 100. This battery pack 100 will be mounted in various devices.

Figure 11:
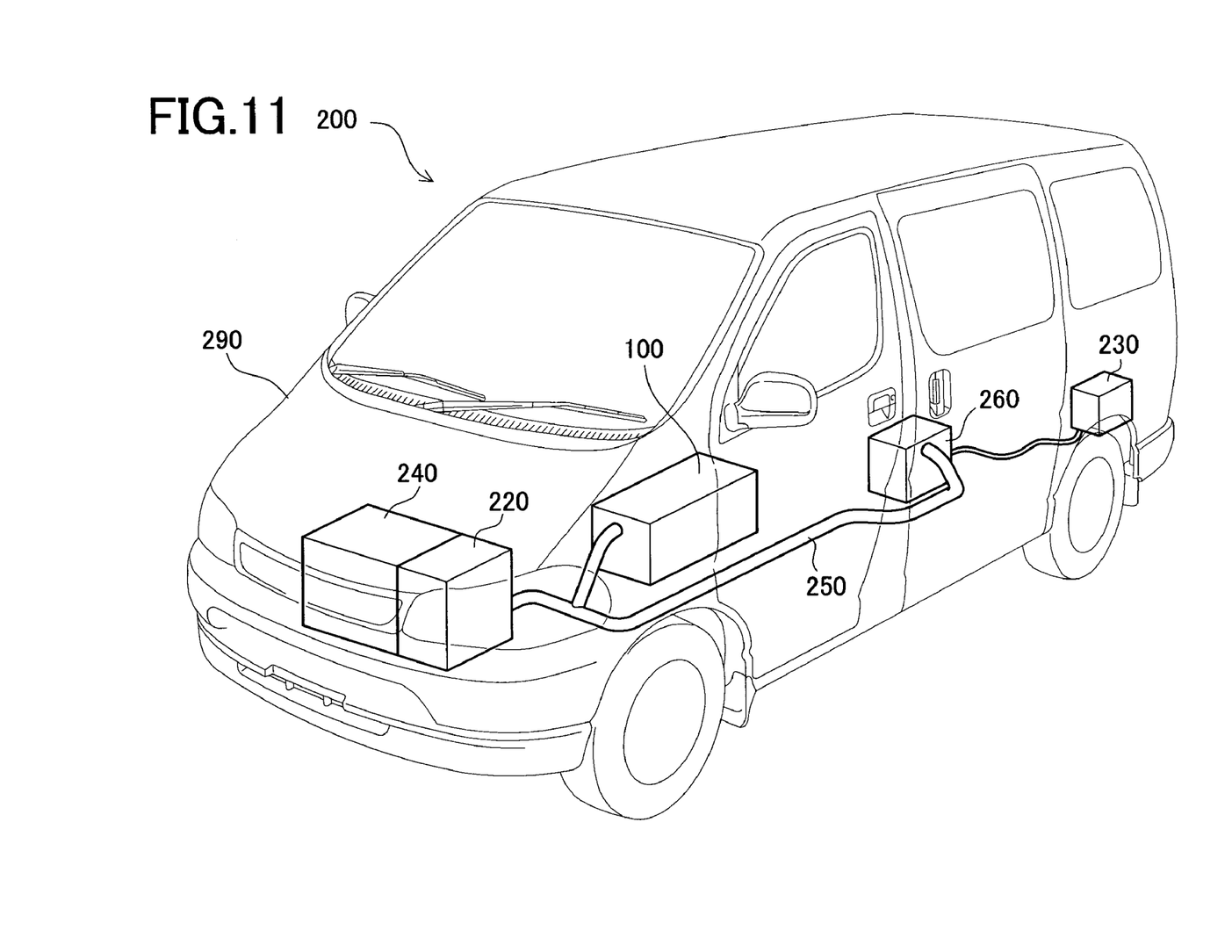
FIG. 11 is an explanatory view showing a vehicle using the secondary batteries in the embodiment.

For example, the battery pack 100 can be mounted and used in a vehicle 200 as shown in FIG. 11. This vehicle 200 is a hybrid electric vehicle to be driven by an engine 240, a front motor 220, and a rear motor 230 in combination. This vehicle 200 includes a vehicle body 290, the engine 240, the front motor 220 attached to the engine 240, the rear motor 230, a cable 250, an inverter 260, and the battery pack 100 internally containing the plurality of secondary batteries 10.

The vehicle may be any vehicle using electric energy obtained from batteries as the whole or a part of a power source. For example, the vehicle may include an electric vehicle, a hybrid electric vehicle, a plug-in hybrid electric vehicle, a hybrid railway vehicle, a fork lift, an electric wheel chair, an electric assist bicycle, and an electric motor scooter.

Figure 12:
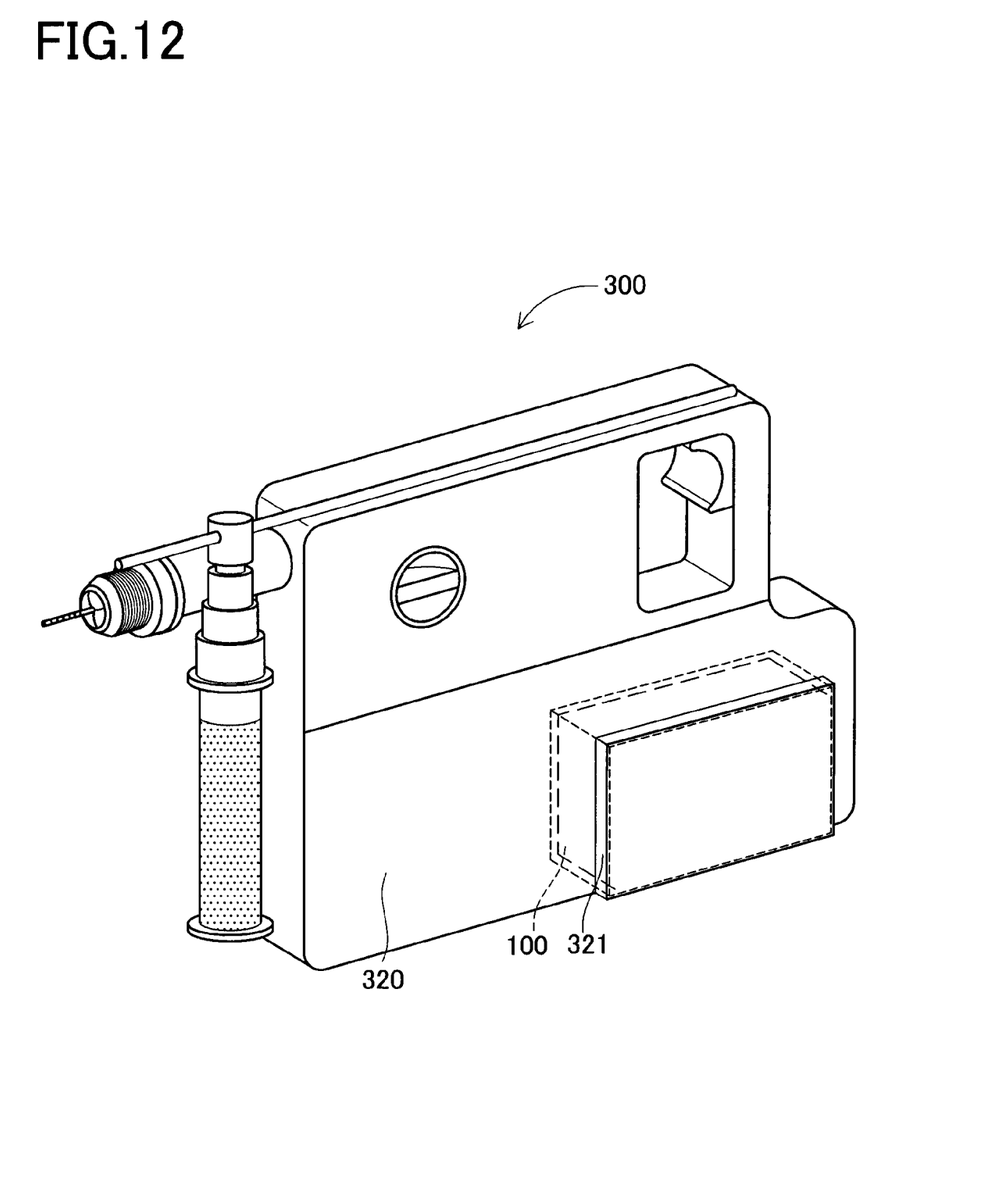
FIG. 12 is an explanatory view showing a hammer drill using the secondary batteries in the embodiment.

The battery pack 100 can also be used in a battery mounting device as shown in FIG. 12. This figure shows a hammer drill 300 mounting the battery pack 100 containing the secondary batteries 10 in this embodiment. This hammer drill 300 is a battery mounting device including the battery pack 100 and a main body 320. The battery pack 100 is detachably contained on a bottom 321 of the main body 320 of the hammer drill 300.

As the battery mounting device, any device may be adopted if only it mounts a battery and utilize it as at least one of energy sources. For example, it may include various home electric appliances, office equipment, and industrial equipment to be driven by batteries such as a personal computer, a cell phone, a battery-driven electric tool, and an uninterruptible power source. Besides the battery pack 100, the battery mounting device may also include a device to be driven by cells which are not in an assembled state.

The above embodiment is merely an example and does not limit the invention. Thus, the invention may be embodied in other specific forms without departing from the essential characteristics thereof. For instance, the number of protrusions, their positions and shapes, and others are not limited to the above. The protrusions have only to be provided at spaced intervals so as to stably support the lid member 31. The inner circumferential wall 25 may be omitted. In other words, a portion of the case 11 on the inner side than the circular groove 22 may be formed to be flat.

The invention claimed is:

1. A sealed battery comprising a battery case formed with a liquid inlet, a power generating element contained in the battery case, and a lid member closing the liquid inlet, a peripheral edge of the lid member being welded to the battery case over the entire circumference, the sealed battery comprising:
   a first facing portion provided in an outer surface of the battery case on an inner circumferential side than a welded portion and around the entire periphery of the liquid inlet, the first facing portion facing a back surface of the lid member;
   a second facing portion provided around the entire periphery of a portion in the back surface of the lid member facing the liquid inlet, the second facing portion facing the first facing portion; and
   a clearance forming member partially placed around the liquid inlet between the first and second facing portions to form a clearance between the first and second facing portions,
   the inside face of the portion melted during welding between the peripheral edge of the lid member and the battery case is linked to the liquid inlet by continuous space through the clearance formed between the first facing portion and the second facing portion by the clearance forming member.

2. The sealed battery according to claim 1, wherein the clearance forming member is a protrusion formed in the first facing portion.

3. The sealed battery according to claim 1, wherein the clearance forming member is a protrusion formed in the second facing portion.

4. The sealed battery according to claim 1, wherein the clearance forming member is protrusions formed in both of the first and second facing portions at places that they do not interfere with each other.

5. The sealed battery according to claim 1, wherein overlapping zone where the peripheral edge of the lid member was welded both at an initial welding stage and at a final welding stage is a portion corresponding to the clearance formed by the clearance forming member.

6. The sealed battery according to claim 1, wherein the clearance forming member is in non-contact with the portions melted in welding the peripheral edge of the lid member in at least overlapping zone where the peripheral edge was welded both at an initial welding stage and at a final welding stage.

7. A method of manufacturing a sealed battery comprising a battery case formed with a liquid inlet, a power generating element contained in the battery case, and a lid member closing the liquid inlet, a peripheral edge of the lid member being welded to the battery case over the entire circumference, the method comprising the steps of:
   preparing the battery case in which a first facing portion is provided in an outer surface of the battery case on the inner circumferential side than a welding portion and around the entire periphery of the liquid inlet, the first facing portion being to face a back surface of the lid member;
   preparing the lid member in which a second facing portion is formed in the back surface of the lid member around the entire periphery of a portion facing the liquid inlet, the second facing portion being to face the first facing portion;
   placing the lid member to cover the liquid inlet of the battery case by partially placing a clearance forming member between the first and second facing portions around the liquid inlet so that a clearance is formed between the first and second facing portions in places where the clearance forming member is absent and a clearance between the peripheral edge of the lid member and the battery case is linked to the liquid inlet by continuous space through the clearance formed between the first and second facing portions by the clearance forming member; and
   welding the peripheral edge of the lid member to the battery case.

8. The sealed battery manufacturing method according to claim 7, wherein the battery case which is further formed with a protrusion serving as the clearance forming member in the first facing portion is prepared in the step of preparing the battery case.

9. The sealed battery manufacturing method according to claim 7, wherein the lid member which is further formed with a protrusion serving as the clearance forming member in the second facing portion is prepared in the step of preparing the lid member.

10. A vehicle that mounts the sealed battery according to claim 1.

11. A battery mounting device that mounts the sealed battery according to claim 1.

12. The sealed battery according to claim 2, wherein overlapping zone where the peripheral edge of the lid member was welded both at an initial welding stage and at a final welding stage is a portion corresponding to the clearance formed by the clearance forming member.

13. The sealed battery according to claim 3, wherein overlapping zone where the peripheral edge of the lid member was welded both at an initial welding stage and at a final welding stage is a portion corresponding to the clearance formed by the clearance forming member.

14. The sealed battery according to claim 4, wherein overlapping zone where the peripheral edge of the lid member was welded both at an initial welding stage and at a final welding stage is a portion corresponding to the clearance formed by the clearance forming member.

15. The sealed battery according to claim 2, wherein the clearance forming member is in non-contact with the portions melted in welding the peripheral edge of the lid member in at least overlapping zone where the peripheral edge was welded both at an initial welding stage and at a final welding stage.

16. The sealed battery according to claim 3, wherein the clearance forming member is in non-contact with the portions melted in welding the peripheral edge of the lid member in at least overlapping zone where the peripheral edge was welded both at an initial welding stage and at a final welding stage.

17. The sealed battery according to claim 4, wherein the clearance forming member is in non-contact with the portions melted in welding the peripheral edge of the lid member in at least overlapping zone where the peripheral edge was welded both at an initial welding stage and at a final welding stage.

18. The sealed battery according to claim 5, wherein the clearance forming member is in non-contact with the portions melted in welding the peripheral edge of the lid member in at least overlapping zone where the peripheral edge was welded both at an initial welding stage and at a final welding stage.

19. The sealed battery manufacturing method according to claim 8, wherein the lid member which is further formed with a protrusion serving as the clearance forming member in the second facing portion is prepared in the step of preparing the lid member.

* * * * *